US010040246B2

(12) United States Patent
Sakazaki

(10) Patent No.: US 10,040,246 B2
(45) Date of Patent: Aug. 7, 2018

(54) SHEET BONDING METHOD, SHEET BONDING DEVICE, AND TRANSFUSION BAG

(71) Applicant: FUJIFILM Corporation, Tokyo (JP)

(72) Inventor: Yoshiki Sakazaki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 100 days.

(21) Appl. No.: 15/091,678

(22) Filed: Apr. 6, 2016

(65) Prior Publication Data
US 2016/0214314 A1  Jul. 28, 2016

Related U.S. Application Data

(63) Continuation of application No. PCT/JP2014/076808, filed on Oct. 7, 2014.

(30) Foreign Application Priority Data

Oct. 18, 2013  (JP) .................. 2013-217319

(51) Int. Cl.
*B29C 65/38* (2006.01)
*B29C 65/00* (2006.01)
(Continued)

(52) U.S. Cl.
CPC ........... *B29C 66/00141* (2013.01); *A61J 1/10* (2013.01); *B29C 65/18* (2013.01);
(Continued)

(58) Field of Classification Search
CPC ............ B29C 65/7811; B29C 65/7817; B29C 65/7832; B29C 66/8491; Y10T 156/103;
(Continued)

(56) References Cited

U.S. PATENT DOCUMENTS

| 4,058,953 A | 11/1977 | Sanborn, Jr. et al. |
| 5,662,575 A | 9/1997 | Saito et al. |
| 2005/0257501 A1 | 11/2005 | Natterer |

FOREIGN PATENT DOCUMENTS

| EP | 0287789 A1 | 10/1988 |
| EP | 1347786 A1 | 10/2003 |

(Continued)

OTHER PUBLICATIONS

The First Office Action, dated Oct. 26, 2016, in corresponding CN Application No. 201480056563.0, 13 pages in English and Chinese.
(Continued)

*Primary Examiner* — Mark A Osele
*Assistant Examiner* — Nickolas Harm
(74) *Attorney, Agent, or Firm* — Sughrue Mion, PLLC

(57) ABSTRACT

A sheet bonding device includes a pressurization mold which is constituted of an upper mold and a lower mold and performs sealing through heating by sandwiching a sealing target portion of a bag main body and a sealing target portion of a gas barrier function sheet with pressurization surfaces; a plurality of support pins which are provided in the lower mold so as to be retractable and position the gas barrier function sheet with respect to one surface of the bag main body by penetrating the sealing target portions of the bag main body and the gas barrier function sheet; and gas spray means for making the gas barrier function sheet float by spraying inert gas to an area-enlarged portion, which does not overlap the bag main body, of the gas barrier function sheet supported by the support pins.

18 Claims, 16 Drawing Sheets

(51) Int. Cl.
*A61J 1/10* (2006.01)
*B29C 65/18* (2006.01)
*B29C 65/50* (2006.01)
*B32B 3/06* (2006.01)
*B32B 7/04* (2006.01)
*B32B 27/08* (2006.01)
*B29C 65/78* (2006.01)
*B29L 31/00* (2006.01)
*B29C 65/30* (2006.01)
*B29C 65/48* (2006.01)
*B29L 9/00* (2006.01)

(52) U.S. Cl.
CPC ...... *B29C 65/5057* (2013.01); *B29C 65/7808* (2013.01); *B29C 65/7811* (2013.01); *B29C 65/7841* (2013.01); *B29C 65/7855* (2013.01); *B29C 66/1122* (2013.01); *B29C 66/43* (2013.01); *B29C 66/5326* (2013.01); *B29C 66/72321* (2013.01); *B29C 66/72325* (2013.01); *B29C 66/72341* (2013.01); *B29C 66/72343* (2013.01); *B29C 66/73186* (2013.01); *B29C 66/8322* (2013.01); *B29C 66/8432* (2013.01); *B29C 66/8511* (2013.01); *B32B 3/06* (2013.01); *B32B 7/04* (2013.01); *B32B 27/08* (2013.01); *B29C 65/305* (2013.01); *B29C 65/4815* (2013.01); *B29C 65/4835* (2013.01); *B29C 65/7817* (2013.01); *B29C 65/7832* (2013.01); *B29K 2995/0067* (2013.01); *B29L 2009/00* (2013.01); *B29L 2031/7128* (2013.01); *B29L 2031/7148* (2013.01); *B29L 2031/737* (2013.01); *B29L 2031/753* (2013.01); *B32B 2307/31* (2013.01); *B32B 2307/7242* (2013.01); *B32B 2439/46* (2013.01); *B32B 2439/70* (2013.01); *B32B 2439/80* (2013.01); *Y10T 156/103* (2015.01); *Y10T 156/107* (2015.01); *Y10T 156/1052* (2015.01); *Y10T 156/1093* (2015.01); *Y10T 156/1304* (2015.01); *Y10T 156/1746* (2015.01)

(58) Field of Classification Search
CPC ........... Y10T 156/1052; Y10T 156/107; Y10T 156/1093; Y10T 156/1304; Y10T 156/1746
USPC ......... 156/156, 228, 244.14, 244.18, 244.27, 156/287, 381, 513, 556, 580, 583.1
See application file for complete search history.

(56) References Cited

FOREIGN PATENT DOCUMENTS

| | | |
|---|---|---|
| EP | 1521706 A1 | 4/2005 |
| EP | 2374730 A1 | 10/2011 |
| JP | 61-186566 U | 11/1986 |
| JP | 10-335433 A | 12/1998 |
| JP | 11-056970 A | 3/1999 |
| JP | 11-348171 A | 12/1999 |
| JP | 2004-323066 A | 11/2004 |
| JP | 2004-329433 A | 11/2004 |
| JP | 3112358 U | 8/2005 |
| JP | 2008-239199 A | 10/2008 |
| JP | 2010-076803 A | 4/2010 |
| JP | 201088723 A | 4/2010 |
| JP | 2011-073715 A | 4/2011 |

OTHER PUBLICATIONS

Communication dated Sep. 20, 2016, issued by the European Patent Office in corresponding European Application No. 14854170.9.
International Search Report of PCT/JP2014/076808 dated Dec. 16, 2014 [PCT/ISA/210].
Written Opinion of PCT/JP2014/076808 dated Dec. 16, 2014 [PCT/ISA/237].
Communication dated Jun. 9, 2017, from the State Intellectual Property Office of the P.R.C., in counterpart Chinese application No. 201480056563.0.

SHEET BONDING METHOD, SHEET BONDING DEVICE, AND TRANSFUSION BAG

CROSS-REFERENCE TO RELATED APPLICATIONS

The present application is a Continuation of PCT International Application No. PCT/JP2014/076808 filed on Oct. 7, 2014 claiming priority under 35 U.S.C § 119 to Japanese Patent Application No. 2013-217319 filed on Oct. 18, 2013. The above application is hereby expressly incorporated by reference, in their entirety, into the present application.

BACKGROUND OF THE INVENTION

1. Field of the Invention

The present invention relates to a sheet bonding method, a sheet bonding device, and a transfusion bag, and particularly relates to a technology for substituting air in a sealed space with desired gas (for example, inert gas) when bonding a functional sheet to a periphery portion of a bag main body filled with a transfusion by sealing these with each other.

2. Description of the Related Art

In general, a liquid medicine, a powder medicine, food, powder (sugar or the like), which is sensitive to humidity, an inspection chip, which detects specific gas, and the like are packaged in a package (packaging container). As a kind of such a package, for example, a transfusion bag filled with a transfusion containing sugar, an electrolyte, amino acids, vitamins, or the like is well known. A transfusion bag in which a resin film (plastic film) is made in a bag shape has been used in view of good handling properties, being lightweight, reduction in volume of waste, or the like.

The resin film, which is used as the material of a bag main body directly touching a liquid medicine in the bag-like body constituting this transfusion bag, has a low function such as gas barrier properties. This is because an additive which improves gas barrier properties of the film or the like is not used in order to prevent elution of such an additive in the transfusion.

However, it is easy for the liquid medicine, such as sugar, amino acids, or an electrolyte, with which the transfusion bag is filled, to significantly deteriorate due to oxygen. Therefore, if the bag main body is left to stand in the air, the liquid medicine deteriorates due to oxygen in the air transmitted through the transfusion bag.

Therefore, the gas barrier properties are secured (for example, JP1999-56970A (JP-H11-56970A) and JP1999-348171A (JP-H11-348171A)) by constituting the transfusion bag after bonding two functional sheets, which have a function layer with high gas barrier properties, to both surfaces of the bag main body formed of a resin film or the like.

The bonding of functional sheets is performed by sealing the gas barrier sheets with the bag main body through thermal welding or the like of the periphery portion of the bag main body after making these overlap each other.

However, when bonding the gas barrier film to the bag main body, there is a problem in that air enters the sealed space between the bag main body and the gas barrier film and oxygen in the entering air transmits the bag main body, and therefore, the liquid medicine is deteriorated.

Here, the sealed space refers to a space of an inner portion of the sealed portion between the bag main body and the gas barrier film.

Accordingly, in a case of bonding the gas barrier film to the bag main body, it is necessary to substitute air, which has entered the sealed space between the bag main body and the gas barrier film, with desired gas, for example, inert gas, or to remove the air.

In this manner, the necessity of substituting the air in the sealed space with desired gas or removing the air is not limited to the transfusion bag, and the same applies to an inspection chip or a package, such as a container or a bag body made of a plastic film, of food which easily deteriorates due to oxygen or the like. In addition, the desired gas is not limited to inert gas, and may be gas which is harmless or harmful to a substance packaged in a package.

In the related art, as a gas substitution method for substituting air in a sealed space with gas, there are, for example, JP2011-73715A and JP2004-323066A. This method is a method for sealing an opening of the sealed space through thermal welding or the like after inserting a gas nozzle into the sealed space, purging gas in the sealed space, and pulling the gas nozzle.

In addition, as the deaerating method for removing air in a sealed space, there is, for example, JP2010-76803A. This method is a method for sealing an opening through thermal welding or the like by removing air in a sealed space within a vacuum chamber for vacuum packaging after preparing the vacuum chamber.

SUMMARY OF THE INVENTION

However, it is necessary to insert a gas nozzle into a sealed space and to remove the gas nozzle from the sealed space for gas substitution in the related art. Therefore, there is a problem in that it is easy for air to enter the sealed space again when drawing the gas nozzle from the sealed space. Thus, it is impossible to sufficiently decrease the concentration of oxygen in the sealed space. It is necessary to include a special instrument for preventing air from entering a package side or a gas nozzle side as in JP2011-73715A and JP2004-323066A in order to prevent air from entering again. Therefore, there is a disadvantage in that such a special instrument increases running costs and device costs.

In addition, the vacuum-deaeration method using a vacuum chamber as in JP2010-76803A has a disadvantage in that the necessity of the chamber increases the scale of the device.

An object of the present invention is to provide a sheet bonding method, a sheet bonding device, and a transfusion bag which can efficiently substitute air in a sealed space with desired gas using an extremely simple configuration when bonding a functional sheet to a bonding target object by sealing a periphery portion of the bonding target object after making the bonding target object and the functional sheet overlap each other.

A sheet bonding method for achieving the object of the present invention is a sheet bonding method for bonding a functional sheet to a bonding target object by sealing a periphery portion of the bonding target object after making the bonding target object and the functional sheet overlap each other, the method including: a preparation step of forming in advance an area-enlarged portion in which overlapping does not occur on the outside of a sealed portion of the bonding target object and the functional sheet, which are disposed on the upper side, out of the bonding target object and the functional sheet which overlap each other; an overlapping step of making the bonding target object and the functional sheet overlap each other while positioning the area-enlarged portion so as to be in a non-overlapping state;

a gas substitution step of substituting air in a sealed space, which is formed between the bonding target object and the functional sheet, with desired gas by spraying gas to the area-enlarged portion from the lower side, after the overlapping step; and a sealing step of sealing the periphery portion of the bonding target object while performing the gas substitution step.

In the sheet bonding method of the present invention, either of the bonding target object and the functional sheet may be disposed on the upper side in a case of making the bonding target object and the functional sheet overlap each other. It is preferable that the bonding target object be a package.

In a case of disposing the functional sheet on the upper side, the functional sheet in which an area-enlarged portion that does not overlap the bonding target object is formed on the outside of the sealed portion is first prepared. Then, the bonding target object and the functional sheet are made to overlap each other while being positioned such that the area-enlarged portion of this functional sheet does not overlap the bonding target object.

In contrast, in a case of disposing the bonding target object on the upper side, the bonding target object in which an area-enlarged portion that does not overlap the functional sheet is formed on the outside of the sealed portion is first prepared. Then, the bonding target object and the functional sheet are made to overlap each other while being positioned such that the area-enlarged portion of this bonding target object does not overlap the functional sheet.

Next, air in the sealed space between the bonding target object and the functional sheet is substituted with gas by spraying gas to the area-enlarged portion of the functional sheet (or the bonding target object) from the lower side.

In this manner, in a case of disposing the functional sheet on the upper side, a state, in which the upper side of the bonding target object is covered with the functional sheet having the area-enlarged portion with an area larger than that of the bonding target object, is entered. Gas is retained in the lower space of the functional sheet by spraying gas to the area-enlarged portion of the functional sheet in this state. As a result, an atmosphere space of gas is formed in the lower space of the functional sheet.

Similarly, in a case of disposing the bonding target object on the upper side, a state, in which the upper side of the functional sheet is covered with the bonding target object having the area-enlarged portion with an area larger than that of the functional sheet, is entered. Gas is retained in the lower space of the bonding target object by spraying gas to the area-enlarged portion of the bonding target object in this state. As a result, an atmosphere space of gas is formed in the lower space of the bonding target object.

Accordingly, air of the sealed space is substituted with gas since gas gradually flows into the sealed space between the bonding target object and the functional sheet. In addition, it is possible to form a gas layer of gas in the sealed space by forming an atmosphere space of gas in the lower space of the functional sheet (or the bonding target object), and therefore, it is possible to prevent air from entering the sealed space again.

In this case, it is preferable to spray gas to the area-enlarged portion such that the functional sheet (or the bonding target object) slightly floats (for example, about 1 mm to 5 mm) from the bonding target object (or the functional sheet). Accordingly, air accumulated in the sealed space is easily released and gas easily enters the sealed space. Thus, it is possible to promptly and efficiently substitute air in the sealed space with gas.

The present invention is not limited to the slight floating of the functional sheet (or the bonding target object) from the bonding target object (or the functional sheet) by spraying gas, and it is possible to provide means for supporting the functional sheet (or the bonding target object) so as to form a space between the bonding target object and the functional sheet, or to form a space between the bonding target object and the functional sheet by forming irregularity on the surface of the bonding target object.

Finally, the periphery portion of the bonding target object and the functional sheet are sealed in the sealing step while performing the above-described gas substitution step.

As described above, the present invention does not perform insertion and removal of a gas nozzle into/from the sealed space as in the related art. Therefore, it is unnecessary to have a special instrument for preventing air from entering a package side or a gas nozzle side again, and to have a large device such as a vacuum chamber.

Accordingly, in the sheet bonding method of the present invention, it is possible to efficiently substitute air in the sealed space with gas using an extremely simple configuration in which desired gas is sprayed to the area-enlarged portion of the functional sheet, when bonding the functional sheet to the bonding target object by sealing the periphery portion of the bonding target object after making the bonding target object and the functional sheet overlap each other.

In the sheet bonding method of the present invention, it is preferable that the area-enlarged portion is formed by forming a cutout portion in the bonding target object or in the functional sheet. Alternatively, it is preferable to form the area-enlarged portion by forming a through hole in the bonding target object. The case where a cutout portion is formed in the bonding target object is a case where the functional sheet is disposed on the upper side, and the case where a cutout portion is formed in the functional sheet is a case where the bonding target object is disposed on the upper side.

This embodiment shows a preferred aspect for forming an area-enlarged portion in a bonding target object or a functional sheet, and it is possible to form an area-enlarged portion by changing the relative shapes of the bonding target object and the functional sheet.

In the sheet bonding method of the present invention, it is preferable to spray gas from a horizontal direction of the sealed space while spraying gas to the area-enlarged portion in the gas substitution step.

Accordingly, gas easily enters the sealed space, and therefore, it is possible to promptly and reliably substitute air in the sealed space with gas.

In the sheet bonding method of the present invention, it is preferable that, in the overlapping step, the bonding target object and the functional sheet are positioned by causing a plurality of support pins provided in a pressurization mold which performs the sealing step to penetrate the sealed portion of the bonding target object and the functional sheet or an outer portion of the sealed portion.

In this manner, the sealed portion of the bonding target object and the sealed portion of the functional sheet are made to be positioned by being penetrated by the plurality of support pins provided in the pressurization mold which performs the sealing step. Therefore, it is possible to reliably spray gas to the area-enlarged portion in the gas substitution step. In addition, the support pins are used as positioning means, and therefore, the support pins can play a role as a guide of floating in a case where the functional sheet floats by spraying gas.

In this case, it is preferable that through holes, through which the support pins are inserted, are formed in advance in the bonding target object and the functional sheet.

Accordingly, it is possible to simply position the relationship between the bonding target object and the functional sheet by simply making the support pins pass through the through holes formed in the bonding target object and the functional sheet. In addition, the contact resistance between the support pins and the through holes is more decreased compared to a case of sticking the support pins into the functional sheet. Therefore, it is easy to make the functional sheet float in the gas substitution step.

In the sheet bonding method of the present invention, it is preferable that the plurality of support pins are put into the pressurization mold when performing the sealing step. Accordingly, it is unnecessary to determine the position of the support pins in consideration of the sealing step, and therefore, it is possible to dispose the support pins at appropriate positions. The "putting" in this case includes both a case in which putting is performed by forming a storage hole in which the support pins are stored, in the pressurization mold, and a case of a support pin retracting itself by providing a retractable mechanism.

A sheet bonding device for achieving the object of the present invention in which a functional sheet is bonded to a bonding target object by sealing a periphery portion of the bonding target object after making the bonding target object and the functional sheet overlap each other, includes: a pressurization mold which is constituted of an upper mold and a lower mold and performs sealing through heating by sandwiching a sealed portion of the bonding target object and a sealed portion of the functional sheet with a pressurization surface of the upper mold and a pressurization surface of the lower mold; a plurality of support pins which are provided in the pressurization mold and position the bonding target object and the functional sheet in a state where overlapping does not occur in an area-enlarged portion which is formed in advance in the outer portion of the sealed portion of the bonding target object or the functional sheet, which is disposed on the upper side, out of the bonding target object and the functional sheet which overlap each other, by penetrating the sealed portion of the bonding target object and the functional sheet or the outer portion of the sealed portion; and a gas spray unit (gas spray means) configured to spray gas to the area-enlarged portion from the lower side.

According to the sheet bonding device of the present invention, it is possible to efficiently substitute air in the sealed space with gas using an extremely simple configuration when bonding the functional sheet to the bonding target object by sealing the periphery portion of the bonding target object after making the bonding target object and the functional sheet overlap each other using the above-described configuration.

In the sheet bonding device of the present invention, it is preferable that the gas spray unit includes a diffusion preventing plate for preventing diffusion of the gas sprayed to the area-enlarged portion, to the outside of the area-enlarged portion. Accordingly, it is possible to effectively substitute air in the sealed space with gas at a small amount of gas.

In addition, in the sheet bonding device of the present invention, it is preferable that the gas spray unit includes a first spray unit (first spray means) configured to spray gas to the area-enlarged portion, and a second spray unit (second spray means) configured to spray gas to a sealed space formed between the bonding target object and the functional sheet. Accordingly, it is possible to more promptly and reliably substitute air in the sealed space with gas.

In the sheet bonding device of the present invention, it is preferable that the gas spray unit includes a casing, in which a lower mold is stored, and is provided with at least a pair of opposing gas flow paths as gas blow-out flow paths between a side wall of the casing and a side wall of the lower mold.

This is another preferred aspect of the gas spray unit, and it is possible to easily and reliably substitute air in the sealed space between the bonding target object and the functional sheet with gas by forming the above-described structure.

A transfusion bag for achieving an object of the present invention is formed through the above-described sheet bonding method. Accordingly, it is possible to effectively prevent a liquid medicine, which is stored in the transfusion bag, from deteriorating due to oxygen.

According to the sheet bonding method, the sheet bonding device, and the transfusion bag of the present invention, it is possible to efficiently substitute air in a sealed space with desired gas using an extremely simple configuration when bonding a functional sheet to a bonding target object by sealing a periphery portion of the bonding target object after making the bonding target object and the functional sheet overlap each other.

DESCRIPTION OF THE EMBODIMENTS

Hereinafter, the details of a preferred embodiment of a sheet bonding method, a sheet bonding device, and a transfusion bag of the present invention will be described. The sheet bonding method and the sheet bonding device of the present invention can be applied to various packages, such as a bag body or a container made of plastic, of food, and further to an inspection chip or the like, in addition to the transfusion bag. An example of the transfusion bag will be described below in the present embodiment.

[Overall Configuration of Transfusion Bag]

First, an overall configuration of a transfusion bag 10 formed by the sheet bonding method and the sheet bonding device of the present invention will be described.

Figure 1:
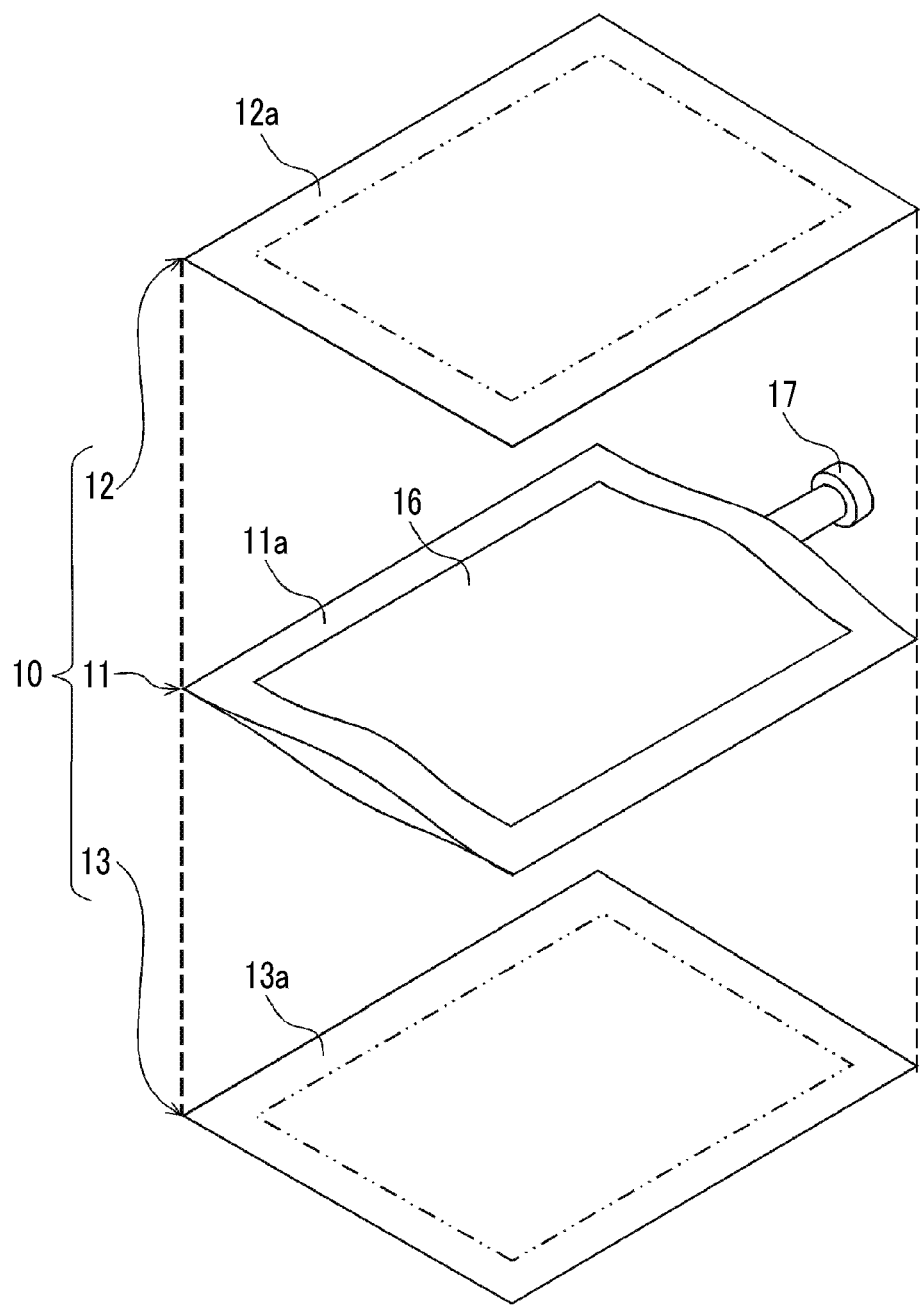
FIG. 1 is an exploded perspective view of a transfusion bag.

The transfusion bag 10 is formed such that rectangular gas barrier function sheets (functional sheets) 12 and 13 are respectively bonded to both the upper and rear surfaces of a rectangular bag main body (bonding target object) 11 as shown in FIG. 1. In the present embodiment, an example of the rectangular transfusion bag 10 will be described, but the shape of the transfusion bag is not limited to the rectangular shape.

The gas barrier function sheets 12 and 13 have a sheet main body 18 (refer to FIG. 3) which includes a base material sheet layer (not shown in the drawing) and a sealing function layer (not shown in the drawing) constituted of a single layer or multiple layers; and an adhesive layer 19 (refer to FIG. 3) which can be adhered to the bag main body 11.

The sealing function layer is, for example, a deposition layer of an inorganic oxide formed on the base material sheet layer, and has gas barrier properties with respect to gas such as oxygen and moisture barrier properties with respect to moisture or the like. In addition, the adhesive layer 19 is adhered to the bag main body 11 by being cooled and solidified or being thermally hardened as it is after being melted at a certain temperature or above.

The type and structure of the gas barrier function sheet 12 are not particularly limited, and any well-known sheet having gas barrier properties can be used.

In addition, in the present embodiment, an example in which the gas barrier function sheet 12 is first bonded to one surface (upper surface) of the bag main body 11 and another gas barrier function sheet 13 is bonded to the other surface of the bag main body 11 will be described.

The bag main body 11 is formed by, for example, sealing four sides in a state in which a flexible functional sheet is folded, or in a state in which two flexible functional sheets are made to overlap each other. A liquid medicine chamber 16, which is filled with a liquid medicine 15 (refer to FIG. 3) and is sealed, is formed in the bag main body 11 by sealing four sides of a periphery portion 11a. In addition, a cylindrical mouth portion 17 which communicates with the inside of the liquid medicine chamber 16 is integrally provided in one end portion in the periphery portion 11a of the bag main body 11 through welding or the like. Although is not shown in the drawing, an opening hole of the mouth portion 17 is sealed by a mouth plug.

The gas barrier function sheet 12 is bonded to one surface (here, upper surface in FIG. 1) of the bag main body 11 by being adhered thereto. More specifically, a four-side sealed portion (corresponding to, for example, a region 12a between a two-dot chain line and the outer circumference which is a portion to be sealed) of the gas barrier function sheet 12 is adhered to the periphery portion 11a of the bag main body 11 so as to surround the liquid medicine chamber 16. Here, a reference numeral 13a of the gas barrier function sheet 13 in FIG. 1 is a portion corresponding to the reference numeral 12a of the gas barrier function sheet 12.

[Sheet Bonding Device]

Figure 2:
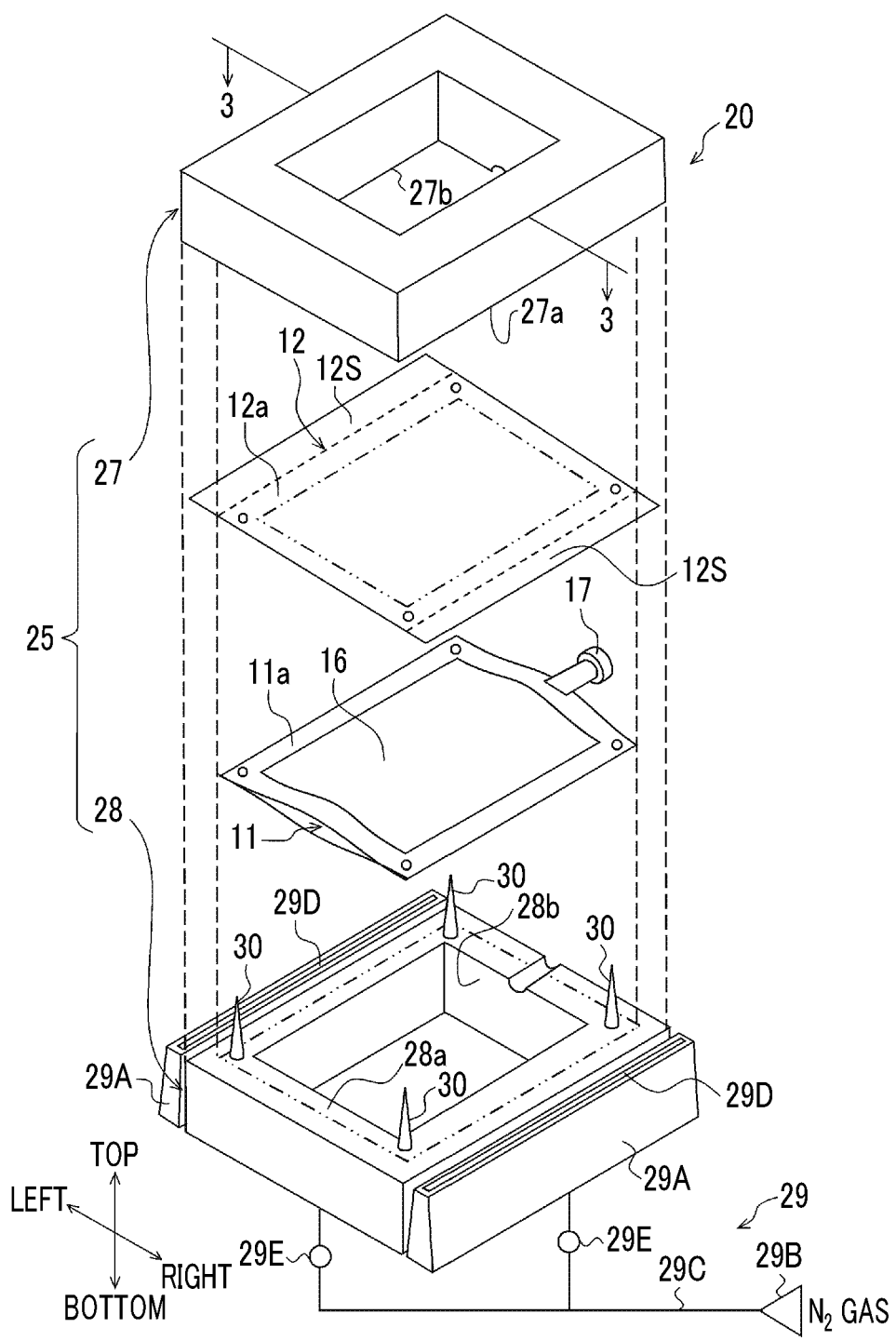
FIG. 2 is a perspective view illustrating a sheet bonding device of the present invention.
Figure 3:
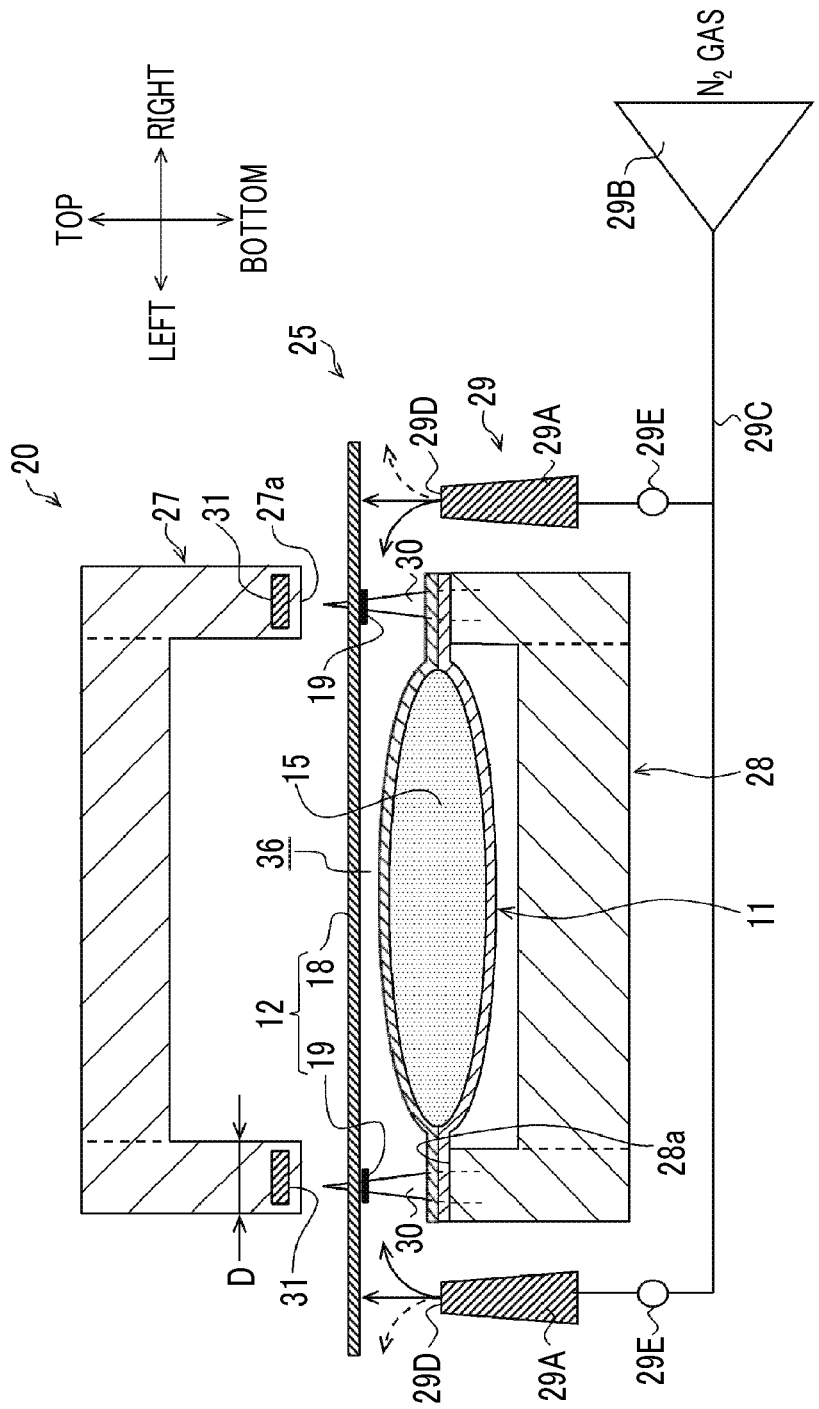
FIG. 3 is a cross-sectional view taken along line 3-3 in FIG. 2 in the sheet bonding device of the present invention.

FIGS. 2 and 3 show a case in which the gas barrier function sheet 12 is bonded on the upper surface of the bag main body 11 using a sheet bonding device 20. That is, an example in which a functional sheet which is the gas barrier function sheet 12 is disposed on the upper side will be described.

As shown in FIGS. 2 and 3, the sheet bonding device 20 of the embodiment of the present invention is mainly constituted of a pressurization mold 25 (also called a metal mold) which adheres the gas barrier function sheet 12 to the periphery portion of the bag main body 11 through pressurization and thermal welding; gas spray means 29 which sprays gas to an area-enlarged portion 12S (refer to FIG. 10 and the details will be described below) of the gas barrier function sheet 12; and a plurality of support pins 30, 30, . . . which position and support the bag main body 11 and the gas barrier function sheet 12 which are bonded to each other.

In the present embodiment, an example of nitrogen gas ($N_2$ gas) which is a type of inert gas as desired gas will be described. In addition, in the present embodiment, the gas barrier function sheet 12 is bonded to the bag main body 11 after being filled with the liquid medicine 15, but the gas barrier function sheet 12 may be bonded to the bag main body 11 before being filled with the liquid medicine 15.

<Pressurization Mold>

As shown in FIGS. 2 and 3, the pressurization mold 25 is constituted of a rectangular upper mold 27 and a rectangular lower mold 28, and a rectangular pressurization surface 27a of the upper mold 27 and a rectangular pressurization surface 28a of the lower mold 28 are disposed opposite to each other. In the present embodiment, the rectangular pressurization mold 25 is used since the rectangular gas barrier function sheet 12 is bonded to the rectangular bag main body 11. However, the pressurization mold 25 is not limited to the rectangular shape.

A rectangular opening hole (also called a cavity) 27b surrounded by the pressurization surface 27a is opened in the upper mold 27 and a rectangular opening hole 28b surrounded by the pressurization surface 28a is opened in the lower mold 28. The width D (refer to FIG. 3) of the pressurization surfaces 27a and 28a of the upper mold 27 and the lower mold 28 approximately corresponds to the width at which four sides of the periphery portion of the bag main body 11 are sealed, and is preferably about 3 mm to 10 mm and more preferably about 3 mm to 5 mm.

In addition, heating unit 31 (refer to FIG. 3) such as a heater which heats the pressurization surface 27a is incorporated in the vicinity of the pressurization surface 27a within the upper mold 27. Furthermore, a pressurization mechanism (for example, cylinder device) which is not shown in the drawing is provided in the upper mold 27. The pressurization surface 28a of the lower mold 28 is pressed by the pressurization surface 27a of the upper mold 27 by elevating and lowering the mechanism with respect to the lower mold 28.

Moreover, when bonding the gas barrier function sheet 12 to the upper surface of the bag main body 11, the periphery portion (four-side sealed portion) of the bag main body 11 and the four-side sealed portion of the gas barrier function sheet 12 are sandwiched between the pressurization surface 27a of the upper mold 27 and the pressurization surface 28a of the lower mold 28, through an operation of the pressurization mechanism. During the sandwiching, the liquid medicine chamber 16 of the bag main body 11 is filled with the liquid medicine 15 and has a bulge is stored in the opening holes 27b and 28b of the upper mold 27 and the lower mold 28.

In general, the upper mold 27 is formed of metal and the lower mold 28 is formed of flexible or hard rubber, but the upper mold and the lower mold are not limited to these configurations. In addition, the heating unit 31 may be provided in the lower mold 28 or in both the upper mold 27 and the lower mold 28 without being limited to the upper mold 27. Furthermore, the pressurization mechanism may be provided in the lower mold 28 or in both the upper mold 27 and the lower mold 28 without being limited to the upper mold 27.

<Gas Spray Means>

FIGS. 2 and 3 show a first embodiment of the gas spray means 29.

As shown in FIGS. 2 and 3, the gas spray means 29 is constituted of a pair of gas ejection devices 29A and 29A which are disposed opposite to both right and left sides of the lower mold 28; gas supply means 29B which supplies nitrogen gas to the pair of gas ejection devices 29A and 29A; and gas piping 29C which supplies nitrogen gas supplied from the gas supply means 29B to the pair of the gas ejection devices 29A and 29A.

A gas ejection device 29A is formed as an elongated device which is disposed along the right and left side surfaces of the lower mold 28, and a slit-like gas ejection port 29D is formed on the upper surface of the gas ejection device 29A. In addition, gas flow rate adjustment valves 29E and 29E which adjust the amount of gas ejected from the pair of the gas ejection devices 29A and 29A are provided in the gas piping 29C. Accordingly, nitrogen gas of which the ejection amount is adjusted is blown out upward from the position of the right and left side surfaces of the lower mold 28 in a belt shape.

In FIG. 2, the gas ejection device 29A is shown as the elongated device in which the slit-like gas ejection port 29D. However, it is possible to dispose a gas ejection nozzle as a single body or to dispose gas ejection nozzles in a row.

In addition, in the present embodiment, gas ejection devices 29A and 29A (two in total) are respectively provided over the right and left side surfaces of the lower mold 28, but gas ejection devices (four in total) may be provided in all of the four side surfaces of the lower mold 28.

Figure 4:
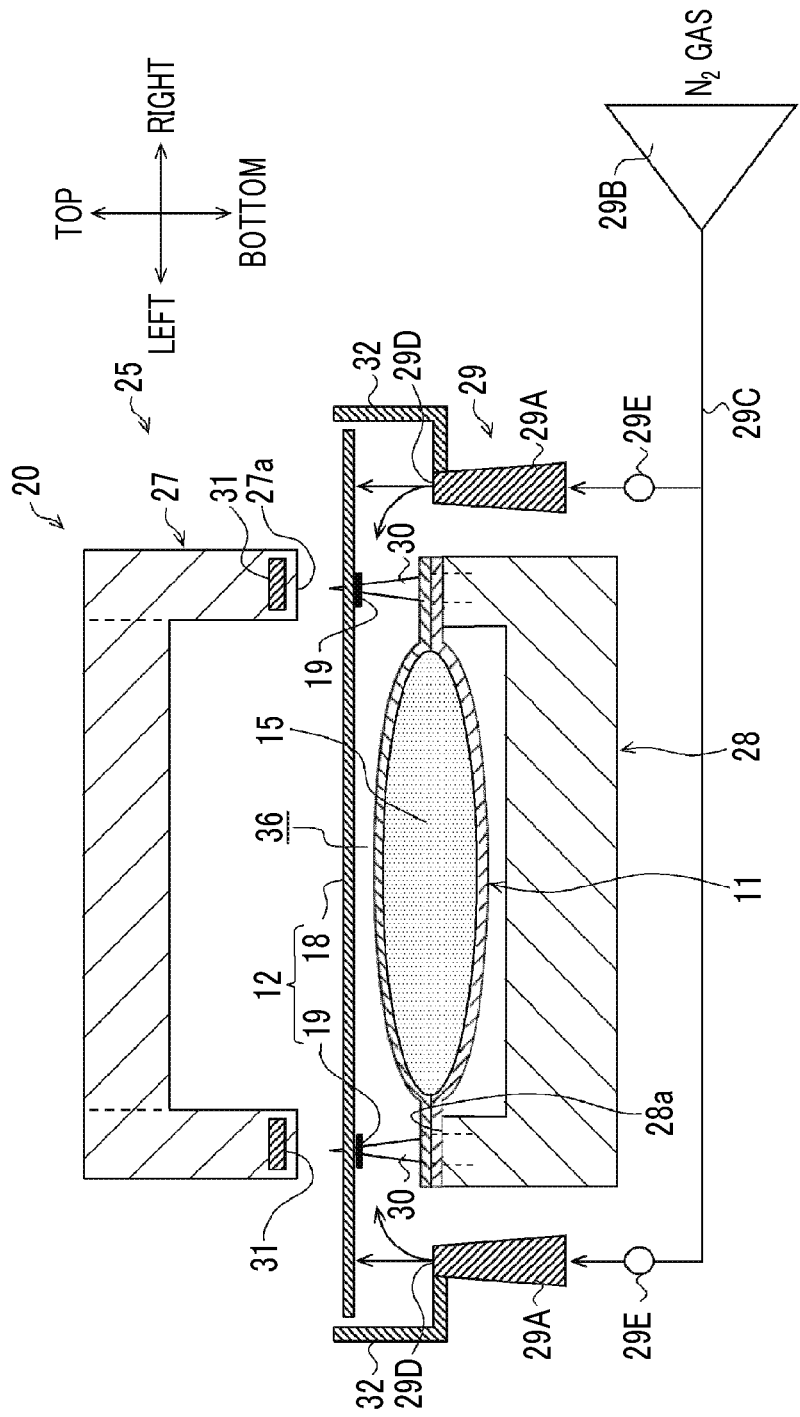
FIG. 4 is a view of another aspect of gas spray means in the sheet bonding device of the present invention.

FIG. 4 is a modification example of the gas spray means 29 of the first embodiment, and is a view in which a diffusion preventing plate 32, which prevents diffusion of nitrogen gas ejected above from the gas ejection device 29A, to outside (in a direction shown by a dotted arrow in FIG. 3 which is outward in a width direction of the gas barrier function sheet 12), is further provided. The diffusion preventing plate 32 is formed as a cross sectional inverted L-shaped plate, which is supported by the upper portion of the side surface of the gas ejection device 29A, and is an elongated plate extending (in front and rear directions in FIG. 4) along the gas ejection device 29A. It is preferable that the tip portion of the diffusion preventing plate 32 is formed so as to be positioned outward in the width of the gas barrier function sheet 12.

Figure 5:
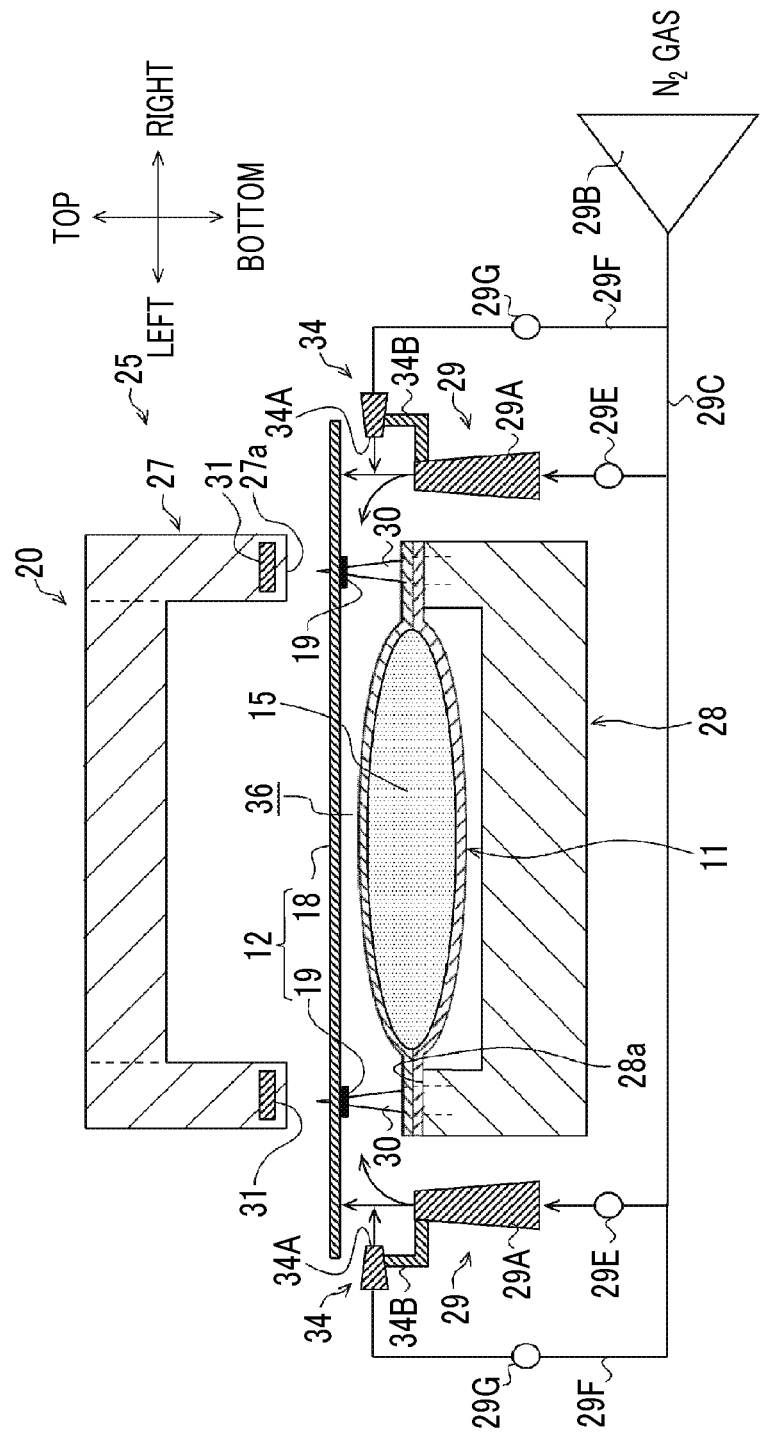
FIG. 5 is a view of still another aspect of gas spray means in the sheet bonding device of the present invention.

FIG. 5 is another modification example of the gas spray means 29 of the first embodiment, and is a view in which a pair of gas ejection auxiliary devices 34 (second spray means) which spray gas toward a sealed space 36 formed between the bag main body 11 and the gas barrier function sheet 12 are disposed opposite to each other across the sealed space 36, in addition to the pair of the above-described gas ejection devices 29A and 29A (first spray means) which spray gas to the area-enlarged portion of the gas barrier function sheet 12. The gas ejection auxiliary devices 34 can be supported by the gas ejection devices 29A through a support plate 34B.

A gas ejection auxiliary device 34 is a device which has a slit-like gas ejection port 34A and is laterally disposed. The gas ejection auxiliary device has the same structure as that of the above-described gas ejection device 29A. In addition, a gas branch piping 29F which is branched from the gas piping 29C is connected to the gas ejection auxiliary device 34, and a gas amount adjustment valve 29G which adjusts the amount of gas ejected is provided in the gas branch piping 29F. Accordingly, nitrogen gas of which the ejection amount is adjusted is blown out toward the sealed space 36 from both sides of the sealed space 36 in a belt shape. Accordingly, nitrogen gas is ejected to the sealed space 36 from the pair of the gas ejection auxiliary devices 34 in addition to nitrogen gas ejected to the area-enlarged portion 12S of the gas barrier function sheet 12 from the pair of gas ejection devices 29A and 29A. Therefore, it is possible to more reliably and promptly substitute air in the sealed space 36 with nitrogen gas.

Figure 6:
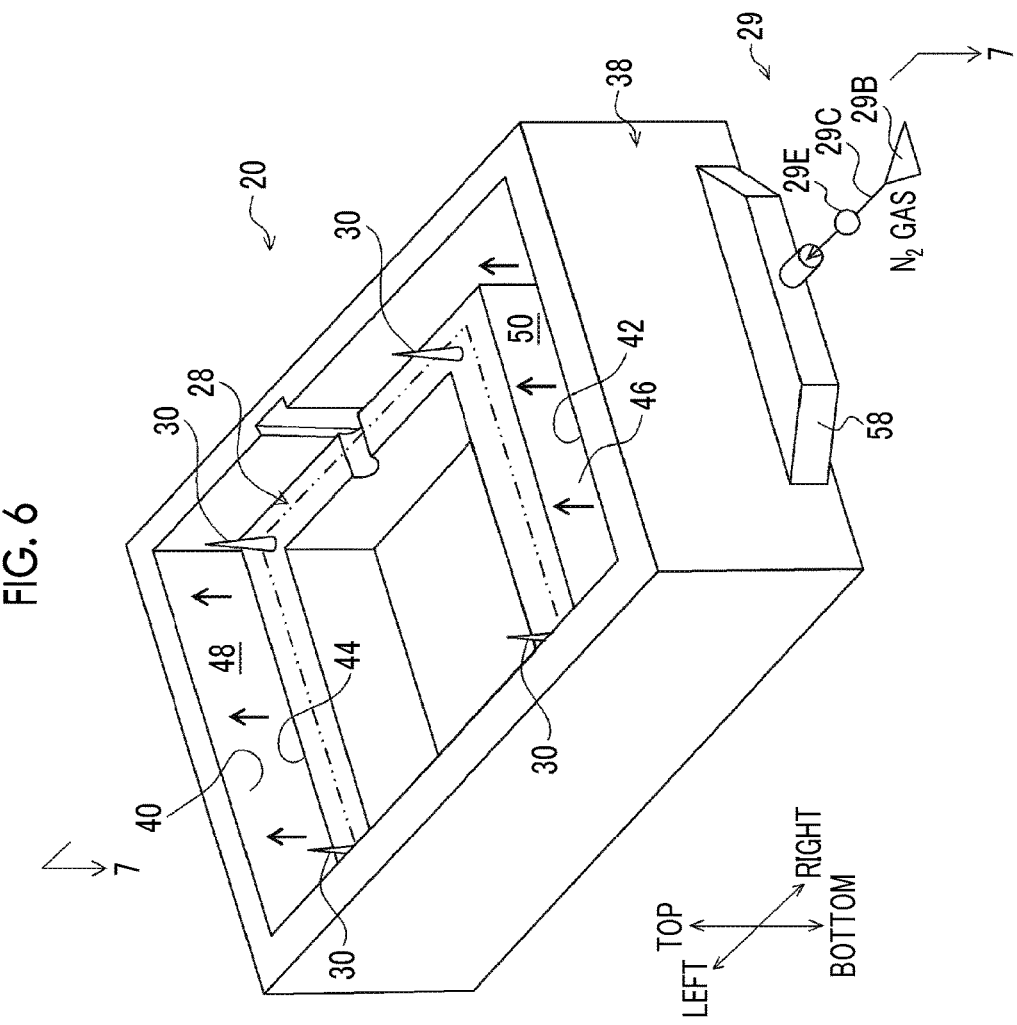
FIG. 6 is a perspective view illustrating a second embodiment of gas spray means in a sheet bonding device of the present invention.
Figure 7:
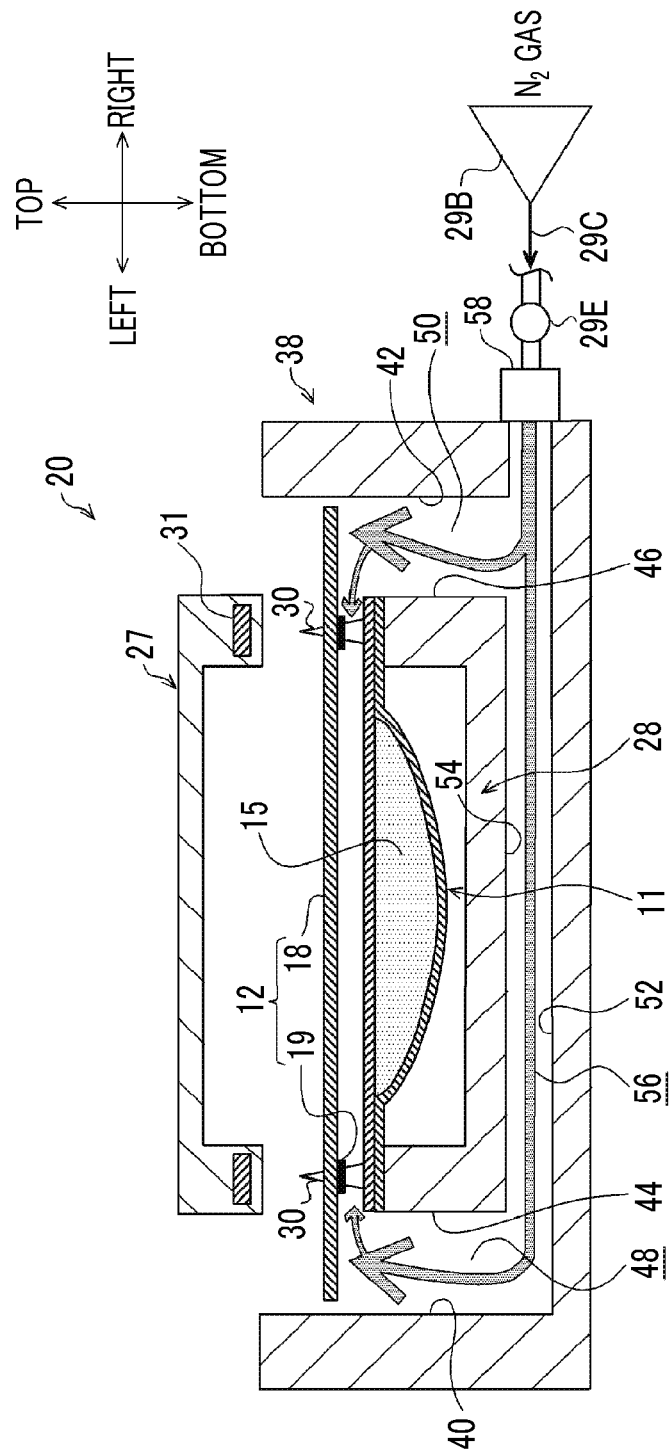
FIG. 7 is a cross-sectional view taken along line 7-7 in FIG. 6 of the second embodiment of the gas spray means.

FIGS. 6 and 7 show a second embodiment of the gas spray means 29.

The gas spray means 29 in FIGS. 6 and 7 forms a flow path blow-out flow path of nitrogen gas is formed between a box-like casing 38 and the lower mold 28 by storing the lower mold 28 of the pressurization mold 25 in the casing 38 of which the upper surface is opened. That is, a left flow path 48 and a right flow path 50 which are gas blow-out flow paths are formed between inner surfaces 40 and 42 (in a lateral direction in FIG. 7) of right and left walls of the casing 38 and outer surfaces 44 and 46 (in a lateral direction in FIG. 7) of right and left walls of the lower mold 28. Furthermore, a communication path 56 which communicates with the left flow path 48 and the right flow path 50 is formed between the inner surface 52 of the bottom wall of the casing 38 and the outer surface 54 of the bottom wall of the lower mold 28. In FIG. 6, an example in which the left flow path 48 and the right flow path 50 are provided so as to be made opposite to the lateral direction of the casing 38 and no flow path is provided at a position of the casing 38 which is orthogonal to the lateral direction is shown.

A manifold 58 for supplying nitrogen gas to the communication path 56 while expanding the flow of nitrogen gas is provided in one end wall of the right and left walls of the casing 38. The manifold 58 is connected to the gas supply means 29B through the gas piping 29C, and a gas flow rate adjustment valve 29E is provided on the way of the gas piping 29C.

In addition, as shown in FIG. 7, the area of the open surface on the upper side of the casing 38 is made to be the same as that of the gas barrier function sheet 12, or is made to be slightly large. In other words, it is preferable to adjust the relationship between the area of the open surface on the upper side of the casing 38 and the size of the gas barrier function sheet 12 so as to substantially block the left flow path 48 and the right flow path 50 using the area-enlarged portion 12S of the gas barrier function sheet 12. Accordingly, when making the gas barrier function sheet 12 overlap the upper portion of the bag main body 11, it is possible to use the casing 38 itself for positioning the gas barrier function sheet 12. Accordingly, four support pins 30 are shown in FIGS. 6 and 7, but it is possible to remove all of the support pins 30 or to reduce the number of support pins to one or two. In addition, if nitrogen gas is ejected from the right flow path 50 and the left flow path 48, nitrogen gas is automatically sprayed on the area-enlarged portion 12S of the gas barrier function sheet 12.

In the gas spray means 29 of the second embodiment of FIGS. 6 and 7, the left flow path 48 and the right flow path 50 are formed between the right and left walls of the casing 38 and the right and left walls 40 and 42 of the lower mold 28. However, it is also possible to form a flow path (flow path of which the cross section is rectangle) which blows out nitrogen gas to all of the sides of the four side walls of the casing 38.

<Support Pin>

In the case of the sheet bonding device shown in FIGS. 2 and 3, the support pins 30 are formed so as to protrude upward at four corners of the pressurization surface 28a of the lower mold 28. As the number of support pins 30, the support pins is preferably disposed at at least two opposing corners of the pressurization surface 28a of the lower mold 28, more preferably at three corners thereof, and particularly preferably at four corners. In addition, it is also possible to dispose more support pins 30 between the four corners. In the sheet bonding devices shown in FIGS. 6 and 7, an example in which the support pins 30 are provided is shown. However, in the case of the sheet bonding device shown in FIGS. 6 and 7, four sides of the gas barrier function sheet 12 are naturally positioned by being surrounded by the four side walls of the casing 38. Therefore, an aspect in which no support pin is used at all may be used.

When bonding the gas barrier function sheet 12 to the bag main body 11, the bag main body 11 and the gas barrier function sheet 12 are penetrated and supported by the support pins 30 (refer to FIG. 3) by being positioned such that the four-side sealed portion (periphery portion) of the bag main body 11 and the four-side sealed portion of the gas barrier function sheet 12 coincide with each other.

Figure 8:
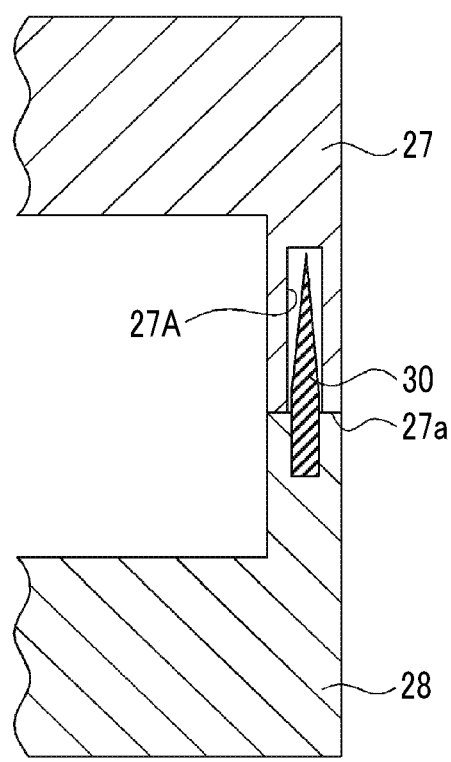
FIG. 8 is an explanatory view in which a support pin in the sheet bonding device of the present invention is put into a pressurization mold.

The support pins 30 are impeditive when the pressurization surface 27a of the upper mold 27 presses the pressurization surface 28a of the lower mold 28. Therefore, as shown in FIG. 8, the pressurization surface 27a of the upper mold 27 is bored with a storage hole 27A which stores a support pin 30.

In addition, a retractable mechanism, in which the support pin 30 protrudes from the lower mold 28 when the pressurization surface 27a of the upper mold 27 does not press the pressurization surface 28a of the lower mold 28 and the support pin 30 is put into the lower mold 28 when the pressurization surface 27a of the upper mold 27 presses the pressurization surface 28a of the lower mold 28, can be provided instead of the storage hole 27A.

Figure 9:
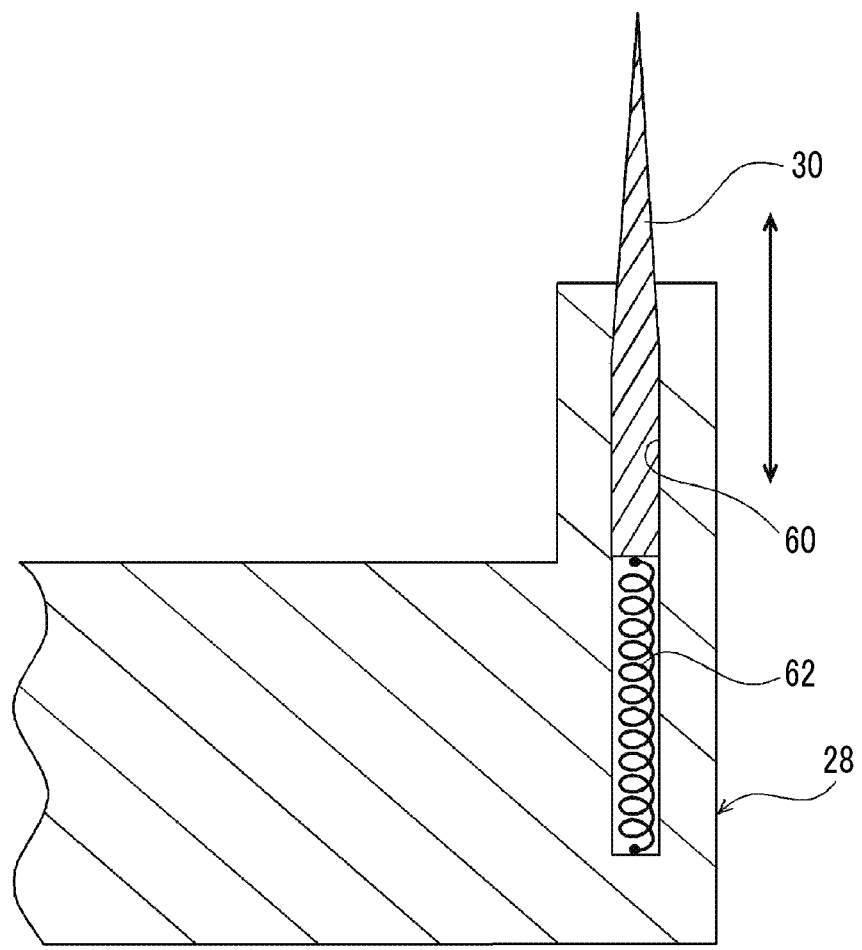
FIG. 9 is an explanatory view of another aspect in which a support pin in the sheet bonding device of the present invention is put into a pressurization mold.

As an example of the retractable mechanism, a configuration, in which the upper end of a compression spring 62 and the lower end of the support pin 30 are connected to each other by forming a hole 60 for putting the support pin 30 into the lower mold 28 and by providing the compression spring 62 in the inside of the hole 60, can be employed as shown in FIG. 9. Accordingly, when the pressurization surface 27a of the upper mold 27 does not press the pressurization surface 28a of the lower mold 28, the compression spring 62 performs extending operation, and therefore, the support pin 30 protrudes from the pressurization surface 28a of the lower mold 28. In addition, when the pressurization surface 27a of the upper mold 27 presses the pressurization surface 28a of the lower mold 28, the compression spring 62 performs contracting operation, and therefore, the support pin 30 is put into the pressurization surface 28a of the lower mold 28. Accordingly, when the bag main body 11 and the gas barrier function sheet 12 are thermally welded by being sandwiched by the upper mold 27 and the lower mold 28, it is possible to prevent the support pin 30 from being impeditive.

A method for positioning the gas barrier function sheet 12 with respect to the bag main body 11 or the like can also be used instead of the support pin 30 by gripping the bag main body 11 and the gas barrier function sheet 12 using a clip or the like. However, the system of the support pin 30 is preferable in consideration of easiness of the configuration or in consideration of the guidance of the floating of the gas barrier function sheet 12 using the support pin 30 when spraying nitrogen gas to the area-enlarged portion 12S of the gas barrier function sheet 12 as will be described below.

[Sheet Bonding Method]

Next, the sheet bonding method of the present embodiment will be described using the sheet bonding device 20 constituted as described above. In the present embodiment, a case of bonding the gas barrier function sheet 12 to the upper surface (one surface) of the bag main body 11 will be described.

<Preparation Step>

Figure 10:
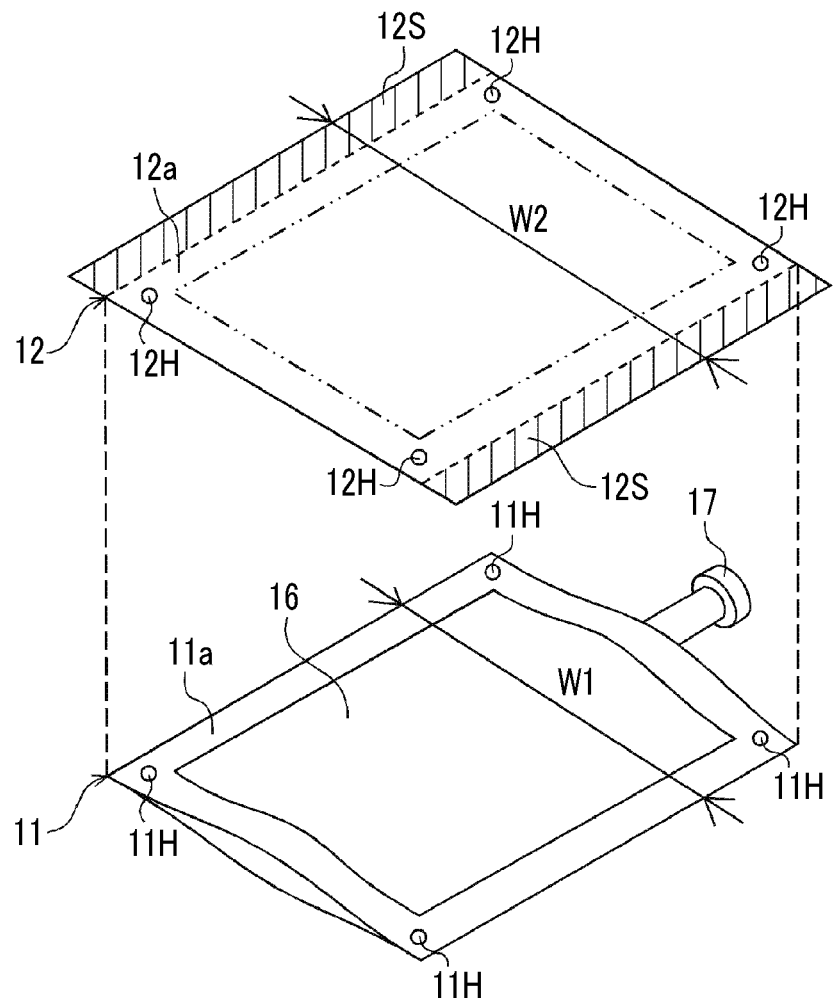
FIG. 10 is an explanatory view of a preparation step in a sheet bonding method of the present invention in which a gas barrier function sheet is bonded to an upper surface of a bag main body.

As shown in FIG. 10, the gas barrier function sheet 12 having the area-enlarged portion 12S which is more enlarged than the area of the upper surface of the bag main body 11 is first prepared as the gas barrier function sheet 12 which is bonded to the upper surface of the bag main body 11.

FIG. 10 shows a case in which the area-enlarged portion 12S (oblique line portion in FIG. 10) is secured and formed by making the width W2 of the gas barrier function sheet 12 be greater than the width W1 of the upper surface in the bag main body 11. For example, in a case in which the width W1 of the upper surface in the bag main body 11 is 100 mm, the width W2 of the gas barrier function sheet 12 can be made to be about 106 mm. Accordingly, area-enlarged portions 12S with a width of 3 mm are respectively secured on both sides of the gas barrier function sheet 12.

A preferable method for securing the area-enlarged portion 12S in the gas barrier function sheet 12 will be further described using FIGS. 11 to 15, but is not limited thereto.

Figure 11:
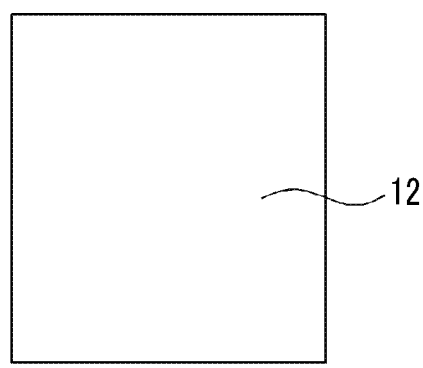
FIG. 11 is a view of an aspect of the functional sheet.
Figure 12:
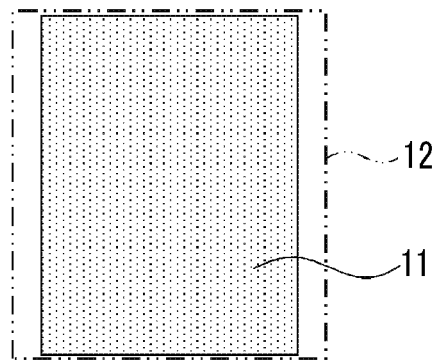
FIG. 12 is an explanatory view illustrating an area-enlarged portion of the gas barrier function sheet from the contrast between the gas barrier function sheet and the bag main body.
Figure 13:
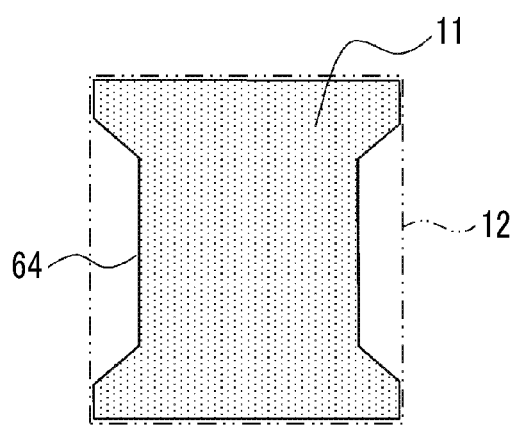
FIG. 13 is another explanatory view illustrating the area-enlarged portion of the gas barrier function sheet.

FIG. 11 shows a size of the gas barrier function sheet 12. In FIGS. 12 and 13, black portions show the upper surface of the bag main body 11 and portions surrounded by the two-dot chain line show the gas barrier function sheet 12. That is, FIG. 12 shows the same sheet as that in FIG. 10, and shows a case in which the area-enlarged portion 12S is formed by increasing the width W2 of the gas barrier function sheet 12 more than the width W1 of the upper surface in the bag main body 11.

FIG. 13 shows a case in which the area-enlarged portion 12S is formed in the gas barrier function sheet 12 by forming a cutout portion 64 on one surface of the bag main body 11.

Figure 14:
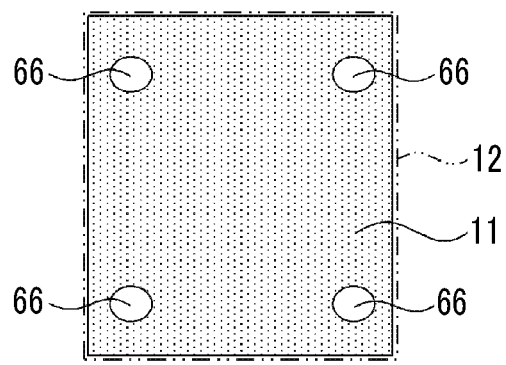
FIG. 14 is still another explanatory view illustrating the area-enlarged portion of the gas barrier function sheet.
Figure 15:
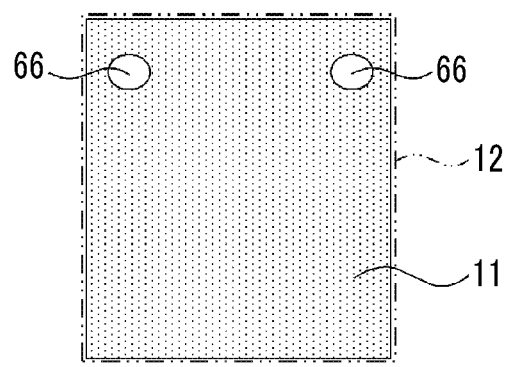
FIG. 15 is still another explanatory view illustrating the area-enlarged portion of the gas barrier function sheet.

In FIGS. 14 and 15, the vertical size and the horizontal size are the same as those of the bag main body 11 and the gas barrier function sheet 12. FIGS. 14 and 15 show a case in which the area-enlarged portion 12S is secured in the gas barrier function sheet 12 by forming a plurality of through holes 66, 66, . . . on the outside of portions of which four sides of the bag main body 11 are sealed. The sections of which the four sides of the bag main body 11 are sealed become inside of the above-described cutout portion 64 or the through holes 66.

<Overlapping Step>

Figure 16:
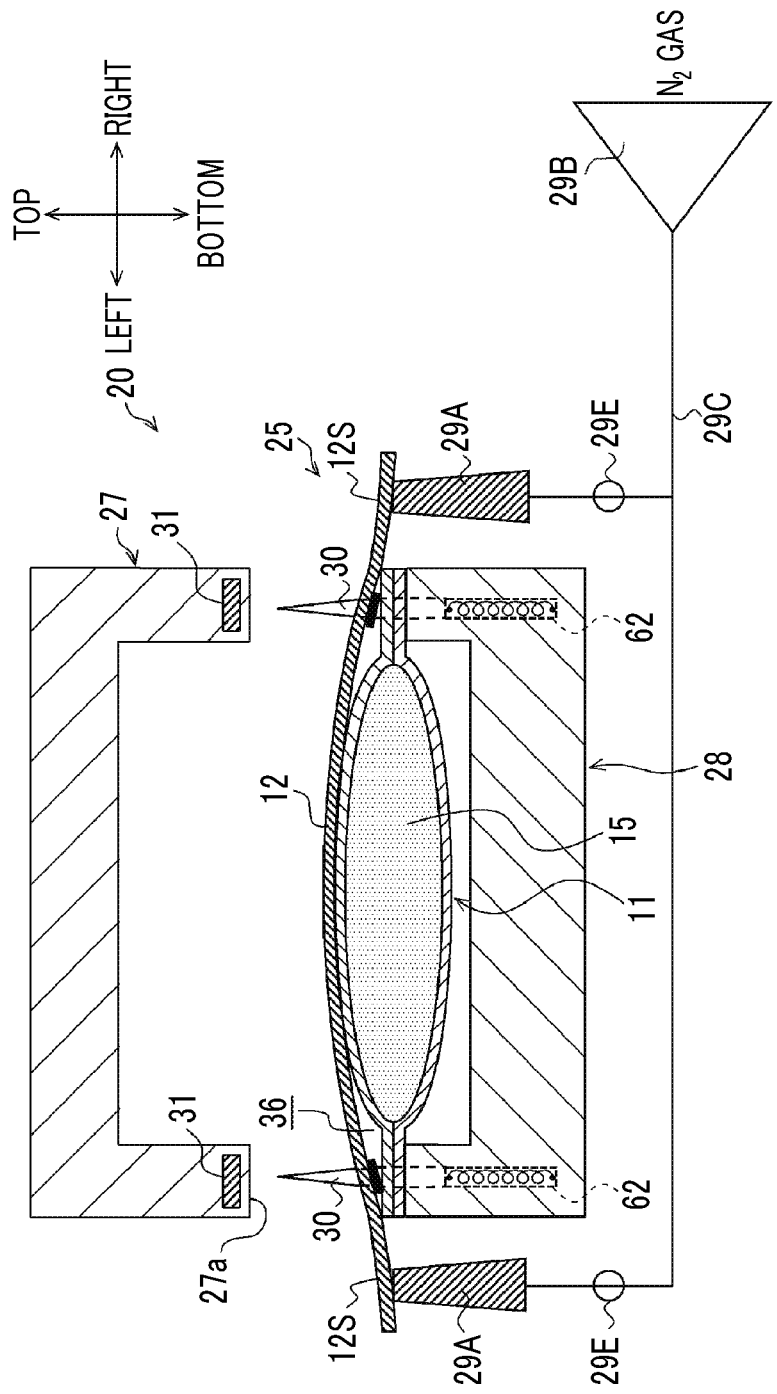
FIG. 16 is an explanatory view of an overlapping step in the sheet bonding method of the present invention.

Next, as shown in FIG. 16, the periphery portion (four-side sealed portion) of the bag main body 11 and the four-side sealed portion of the gas barrier function sheet 12 are penetrated through and supported by four support pins 30 provided in the lower mold 28 of the pressurization mold while positioning the area-enlarged portion 12S of the gas barrier function sheet 12 so as not to overlap one surface of the bag main body 11. The four-side sealed portion of the gas barrier function sheet 12 is on the outside of the two-dot chain line in FIG. 10 and becomes a portion in which the area-enlarged portion 12S is removed.

In this case, it is preferable to previously form four through holes 11H and four through holes 12H, through which the support pins 30 are penetrated, at four corners of the periphery portion (four-side sealed portion) of the bag main body 11 and at four corners of the four-side sealed portion of the gas barrier function sheet 12 as shown in FIG. 10. Accordingly, it is possible to make the gas barrier function sheet 12 overlap the upper surface of the bag main body 11 by simply positioning the gas barrier function sheet on the upper surface of the bag main body. In addition, if the through holes 11H and 12H are previously formed at four corners of the periphery portion (four-side sealed portion) of the bag main body 11 and at four corners of the four-side sealed portion of the gas barrier function sheet 12, it is unnecessary to make the tip end of a support pin 30 be sharp, thereby making the support pin 30 have a thin cylindrical shape.

<Gas Substitution Step>

Figure 17:
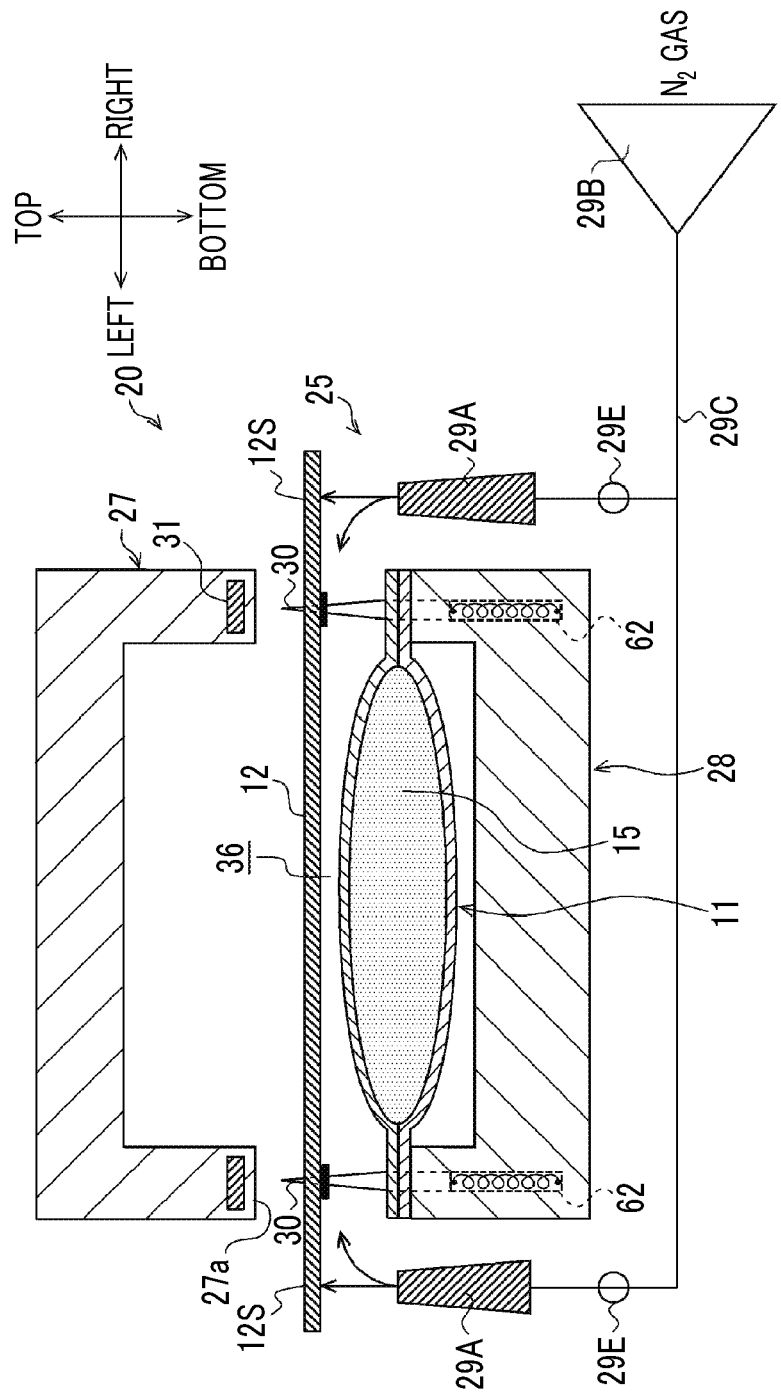
FIG. 17 is an explanatory view of a gas substitution step in the sheet bonding method of the present invention.

Next, as shown in FIG. 17, nitrogen gas atmosphere is formed in a lower space of the gas barrier function sheet 12 by spraying nitrogen gas to the area-enlarged portion 12S of the gas barrier function sheet 12 from a pair of the gas ejection devices 29A.

That is, a state, in which the upper side of the bag main body 11 is covered with the gas barrier function sheet 12 having the area-enlarged portion 12S with an area larger than that of the bag main body 11, is entered. Nitrogen gas is retained in the lower space of the gas barrier function sheet 12 by spraying nitrogen gas to the area-enlarged portion 12S of the gas barrier function sheet 12 in this state. As a result, an atmosphere space of nitrogen gas is formed in the lower space of the gas barrier function sheet 12.

Accordingly, air of the sealed space 36 is substituted with nitrogen gas since nitrogen gas gradually flows into the sealed space 36 between the bag main body 11 and the gas barrier function sheet 12. In addition, it is possible to form a gas layer of nitrogen gas in the sealed space 36 by forming an atmosphere space of nitrogen gas in the lower space of the gas barrier function sheet 12, and therefore, it is possible to prevent air from entering the sealed space 36 again.

In this case, it is preferable to spray nitrogen gas to the area-enlarged portion 12S to the degree that the gas barrier function sheet 12 slightly floats from one surface of the bag main body 11 (for example, about 1 mm to 5 mm) by adjusting the gas flow rate adjustment valve 29E. Accordingly, air in the sealed space 36 is easily released and nitrogen gas easily enters the sealed space 36.

In this floating of the gas barrier function sheet 12, the support pin 30 plays a role as a guide of the floating. That is, the movement of the gas barrier function sheet 12 in a horizontal direction which is supported by the support pin 30 is restricted, and only the movement of the gas barrier function sheet in the longitudinal direction becomes free. Accordingly, it is possible to concentrate a force of spraying nitrogen gas to a floating force of the gas barrier function sheet 12.

In the present embodiment, air in the sealed space 36 is easily released and nitrogen gas easily enters the sealed space 36 by making the gas barrier function sheet 12 float from the bag main body 11 by spraying nitrogen gas. However, the present invention is not limited to the floating of the gas barrier function sheet 12 by spraying gas. For example, it is possible to employ an aspect of providing means (not shown in the drawing) which supports the gas barrier function sheet 12 so as to form a space between the bag main body 11 and the gas barrier function sheet 12, or an aspect of forming a space between the bag main body 11 and the gas barrier function sheet 12 by forming irregularity on the surface of the bag main body 11.

Accordingly, nitrogen gas easily flows into the sealed space 36, and therefore, it is possible to promptly and efficiently substitute air in the sealed space 36 with nitrogen gas.

In the present embodiment, a pair of opposed gas ejection devices 29A are provided as gas spray means 29. Therefore, air in the sealed space 36 is substituted with nitrogen gas due to nitrogen gas which flows in from either opposed sides among four sides of the sealed space 36 and flows out from the other opposed sides.

In addition, in this spraying of nitrogen gas, it is possible to reliably substitute air in the sealed space 36 with nitrogen gas at a small amount of nitrogen gas within a short period of time by providing the diffusion preventing plate 32 shown in FIG. 4 in the gas spray means 29 or further providing the gas ejection auxiliary device 34 in FIG. 5.

In addition, according to the gas spray means 29 of the second embodiment shown in FIGS. 6 and 7, the gas barrier function sheet 12 supported by the support pin 30 is disposed in a state in which the upper surface of the opened casing 38 is almost blocked. In this state, when nitrogen gas is ejected from the left flow path 48 and the right flow path 50, air in the lower space of the gas barrier function sheet 12 is gradually expelled from the upper surface of the casing 38 through the sides of the gas barrier function sheet 12. Accordingly, an atmosphere space of nitrogen gas is formed in the lower space of the gas barrier function sheet 12, that is, in the space surrounded by the gas barrier function sheet 12 and the casing 38. As a result, it is possible to easily and reliably substitute air in the sealed space 36 with nitrogen gas. As described above, an aspect in which no support pin 30 is used at all can be employed in the sheet bonding devices in FIGS. 6 and 7.

In addition, if the gas barrier function sheet 12 is made to slightly float (about 1 mm to 5 mm) by adjusting the gas flow rate adjustment valve 29E, it is possible to more easily substitute air in the sealed space 36 with nitrogen gas. The present invention is not limited to the aspect of making the gas barrier function sheet 12 float as described above, and can also employ an aspect of providing means for supporting the gas barrier function sheet 12 or an aspect of forming a space between the bag main body 11 and the gas barrier function sheet 12 by providing irregularity on the surface of the bag main body 11.

In addition, as shown in FIGS. 14 and 15, in a case of securing the area-enlarged portion 12S of the gas barrier function sheet 12 by making a through hole 66 in the periphery portion of the bag main body 11, nitrogen gas is sprayed toward the through hole 66. Accordingly, in this case, it is preferable to provide a tube-like gas nozzle at a position corresponding to the through hole 66 as a gas ejection device.

<Sealing Step>

Figure 18:
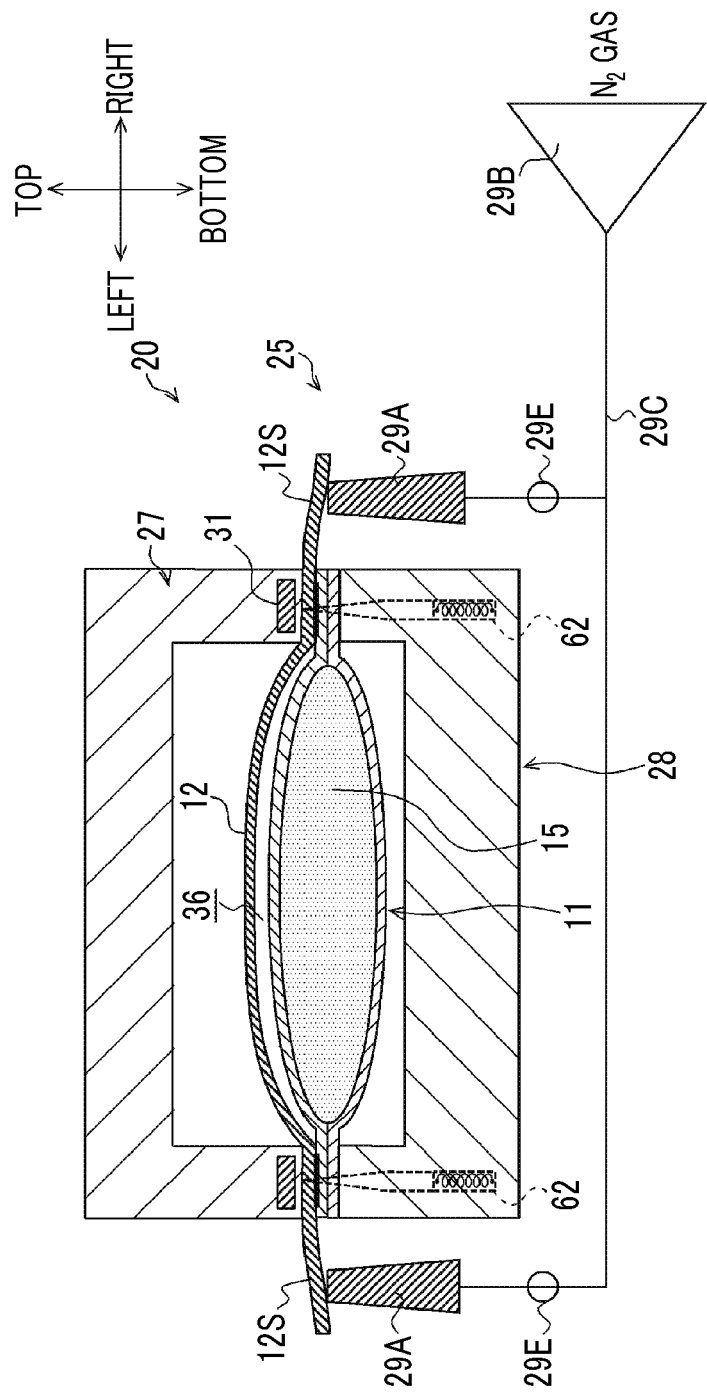
FIG. 18 is an explanatory view of a sealing step in the sheet bonding method of the present invention.

Next, the upper mold 27 is allowed to descend by driving the pressurization mechanism of the pressurization mold 25 while maintaining the ejection of nitrogen gas from the gas ejection device 29A. Then, as shown in FIG. 18, the pressurization surface 28a of the lower mold 28 is pressed by the pressurization surface 27a of the upper mold 27 to sandwich the periphery portion (four-side sealed portion) of the bag main body 11 and the four-side sealed portion of the gas barrier function sheet 12. The heating unit 31 of the upper mold 27 is turned on in this state. The turn-on operation of the heating unit 31 may be performed before the bag main body 11 and the gas barrier function sheet 12 are sandwiched by the pressurization mold 25.

Accordingly, it is possible to bond the gas barrier function sheet 12 to the upper surface of the bag main body 11 and to set nitrogen gas atmosphere within the sealed space 36, which is formed inside the four-side sealed portion between the bag main body 11 and the gas barrier function sheet 12. In FIGS. 16 to 18, the example of the retractable mechanism in FIG. 9 is shown as a mechanism of putting the support pin 30 into the pressurization mold 25 during the sealing step. However, as a matter of course, the storage hole 27A may be provided as illustrated in FIG. 8.

In this manner, according to the sheet bonding method of the present invention, it is possible to efficiently substitute air in the sealed space 36 with nitrogen gas using an extremely simple configuration when bonding the gas barrier function sheet 12 to the bag main body 11 by sealing four sides of the periphery portion on the upper surface after making the gas barrier function sheet 12 overlap the upper surface of the bag main body 11.

Incidentally, in a case where the gas substitution step in the present invention is performed in a gas substitution method in the related art in which a bar-like gas nozzle is inserted into the sealed space 36 to purge nitrogen and is drawn thereafter, the concentration of oxygen in the sealed space 36 can only be decreased to 5%.

In contrast, the concentration of oxygen in the sealed space 36 can be decreased to about 1% by performing the above-described sheet bonding method of the embodiments of the present invention.

The flow of the above-described process from the preparation step to the sealing step shows a process of bonding the gas barrier function sheet 12 to one surface of the bag main body 11.

Accordingly, in a case where the gas barrier function sheet 13 is subsequently bonded to the other surface of the bag main body 11, the bag main body 11 to which the gas barrier function sheet 12 is bonded is supported by the support pin 30 after being turned over.

It is possible to bond the gas barrier function sheet 13 to the other surface of the bag main body 11 by similarly performing the above-described preparation step to sealing step on the gas barrier function sheet 13.

Figure 19:
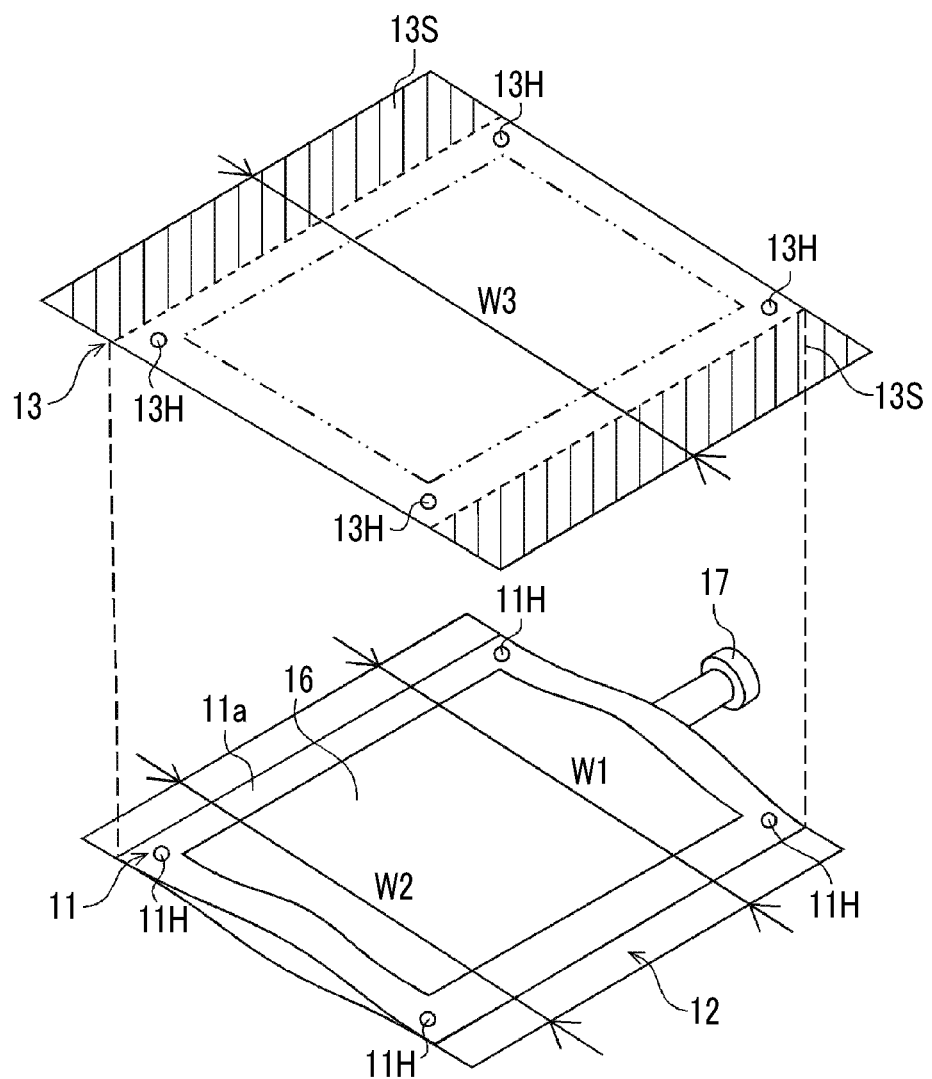
FIG. 19 is an explanatory view of a preparation step in which another gas barrier function sheet is bonded on a rear surface of the bag main body.

In this case, as shown in FIG. 19, it is necessary to form an area-enlarged portion 13S (oblique line portion in FIG. 19) by making the width W3 of the gas barrier function sheet 13 prepared in the preparation step be greater than the width W2 of the gas barrier function sheet 12. The reference numeral 13H is a through hole which is penetrated by the support pin 30.

Accordingly, even in a case where the gas barrier function sheet 13 is bonded to the other surface of the bag main body 11 by sealing four sides of the periphery portion on the other surface side of the bag main body 11, it is possible to efficiently substitute air in the sealed space 36 with nitrogen gas. Accordingly, it is possible to effectively prevent a liquid medicine, which is stored in the transfusion bag 10 produced through the sheet bonding method of the present invention, from deteriorating due to oxygen.

In the above-described embodiments, the example, in which nitrogen gas is sprayed from the lower side to the area-enlarged portion 12S of the gas barrier function sheet 12 by making the gas barrier function sheet 12 overlap the upper side of the bag main body 11, have been described. However, the sheet bonding method of the present invention can be similarly performed also by spraying nitrogen gas from the lower side to an area-enlarged portion (not shown in the drawing) of the bag main body 11 by making the bag main body 11 which has the area-enlarged portion overlap the upper portion of the gas barrier function sheet 12.

In addition, in the present embodiment, the example of the transfusion bag has been described. However, the present invention is not limited thereto and can be applied to various packages, for example, a package, such as a bag-like body or a container, of food, or a package of an inspection chip which detects specific gas.

In addition, the example in which the upper mold 27 is formed of metal and the lower mold 28 is formed of a rubber material has been described. However, at least one of the upper mold 27 and the lower mold 28 may be formed of a metal material, a rubber material, a resin material, a ceramic material, wood, or the like.

In addition, in the above-described embodiments, the example in which the gas barrier function sheets 12 and 13 are respectively bonded to both the upper and rear surfaces of the bag main body 11 has been described. However, the gas barrier function sheet 12 may be bonded to one surface of the bag main body 11 and a bending resistant functional sheet may be bonded to the other surface.

The bending resistant functional sheet has a sheet main body including a base material sheet layer, aluminum layer, and the like; and an adhesive layer which can be adhered to the bag main body 11. This bending resistant functional sheet has gas barrier properties and moisture barrier properties, and is more excellent in bending resistance than the gas barrier function sheets 12 and 13. In addition, the adhesive layer is basically the same as the above-described adhesive layer 19.

In addition, in the above-described embodiments, the example in which the upper mold 27 and the lower mold 28 are formed to have a rectangular shape has been described, but the present invention may be appropriately changed in combination of the shape of the liquid medicine chamber 16.

EXPLANATION OF REFERENCES

10 . . . transfusion bag, 11 . . . bag main body, 11H . . . through hole, 12 . . . gas barrier function sheet, 12S . . . area-enlarged portion, 12H . . . through hole, 13 . . . gas barrier function sheet, 13S . . . area-enlarged portion, 13H . . . through hole, 15 . . . liquid medicine, 16 . . . liquid medicine chamber, 18 . . . sheet main body of liquid medicine bag, 19 . . . adhesive layer of liquid medicine bag, 20 . . . sheet bonding device, 25 . . . pressurization mold, 27 . . . upper mold, 27a . . . pressurization surface of upper mold, 27b . . . opening hole of upper mold, 28 . . . lower mold, 28a . . . pressurization surface of lower mold, 28b . . . opening hole of lower mold, 29 . . . gas spray means, 29A . . . gas ejection device, 30 . . . support pin, 31 . . .

heating unit, 32 . . . diffusion preventing plate, 34 . . . gas ejection auxiliary device, 36 . . . sealed space, 38 . . . casing, 40, 42 . . . inner surface of right and left walls of casing, 44, 46 . . . outer surface of right and left walls of lower mold, 48 . . . left flow path, 50 . . . right flow path, 52 . . . inner surface of bottom wall of casing, 54 . . . outer surface of bottom wall of lower mold, 56 . . . communication path, 58 . . . manifold

What is claimed is:

1. A sheet bonding method for a functional sheet to a bonding target object by sealing a periphery portion of the bonding target object after making the bonding target object and the functional sheet overlap each other, comprising:
    a preparation step of forming on the functional sheet, in advance of making the bonding target object and the functional sheet overlap each other, an area-enlarged portion which is disposed outside of a portion to be sealed of the functional sheet which is to be overlapped with a portion to be sealed of the bonding target object;
    an overlapping step of making the portion to be sealed of the bonding target object and the portion to be sealed of the functional sheet overlap each other;
    a gas substitution step of substituting air in a sealed space, which is formed between the bonding target object and the functional sheet, with gas by spraying the gas to the area-enlarged portion from a side of the bonding target object, after the overlapping step;
    and a sealing step of sealing the periphery portion of the bonding target object in which the bonding target object and the functional sheet are positioned by causing a plurality of support pins provided in a pressurization mold to penetrate the portion to be sealed of the bonding target object and the functional sheet or an outer portion of the portion to be sealed of the bonding target object and the functional sheet while performing the gas substitution step.

2. The sheet bonding method according to claim 1, wherein the bonding target object is a package.

3. The sheet bonding method according to claim 1, wherein the area-enlarged portion is formed by forming a cutout portion in the bonding target object or the functional sheet.

4. The sheet bonding method according to claim 1, wherein the area-enlarged portion is formed by forming a through hole in the bonding target object.

5. The sheet bonding method according to claim 1, wherein, in the gas substitution step, gas is sprayed from the horizontal direction of the sealed space while spraying the gas to the area-enlarged portion.

6. The sheet bonding method according to claim 1, wherein through holes are formed in advance of the overlapping step at positions through which the support pins penetrate the bonding target object and the functional sheet.

7. The sheet bonding method according to claim 1, wherein when performing the sealing step, the plurality of support pins are put into the pressurization mold.

8. A sheet bonding device in which a functional sheet is bonded to a bonding target object by sealing a periphery portion of the bonding target object after making the bonding target object and the functional sheet overlap each other, comprising:
    an area-enlarged portion which is disposed on an outside of a portion to be sealed of the functional sheet which overlaps with a portion to be sealed of the bonding target object;
    a pressurization mold which is constituted of an upper mold and a lower mold each having a pressurizing surface, respectively configured to sandwich the bonding target object and the functional sheet with the pressurizing surfaces of the upper and the lower molds;
    a heater disposed in at least one of the upper mold or the lower mold which provides heat at least to one of the pressurization surfaces of the upper mold and the pressurization surface of the lower mold;
    a plurality of support pins which are provided in the pressurization mold and position the bonding target object and the functional sheet in a state where the plurality of support pins penetrate the portion to be sealed of the bonding target object and the portion to be sealed of the functional sheet or an outer portion of the portions to be sealed of the bonding target object and of the functional sheet; and
    a gas spray unit configured to spray gas to the area-enlarged portion from a side of the bonding target object towards the functional sheet.

9. The sheet bonding device according to claim 8, wherein the gas spray unit includes a diffusion preventing plate for preventing diffusion of the gas sprayed to the area-enlarged portion, to the outside of the area-enlarged portion.

10. The sheet bonding device according to claim 8, wherein the gas spray unit includes
    a first spray unit configured to spray gas to the area-enlarged portion, and
    a second spray unit configured to spray gas to a sealed space formed between the bonding target object and the functional sheet.

11. The sheet bonding device according to claim 8, wherein the gas spray unit includes a casing, in which the lower mold is stored, and is provided with at least a pair of opposing gas flow paths as gas blow-out flow paths between a side wall of the casing and a side wall of the lower mold.

12. A sheet bonding method for a functional sheet to a bonding target object by sealing a periphery portion of the bonding target object after making the bonding target object and the functional sheet overlap each other, comprising:
    a preparation step of forming an area-enlarged portion which is disposed outside of a portion to be sealed of the bonding target object which is to be overlapped with a portion to be sealed of the functional sheet;
    an overlapping step of making the portion to be sealed of the bonding target object and the portion to be sealed of the functional sheet overlap each other;
    a gas substitution step of substituting air in a sealed space, which is formed between the bonding target object and the functional sheet, with gas by spraying the gas to the area-enlarged portion from a side of the functional sheet, after the overlapping step;
    and a sealing step of sealing the periphery portion of the bonding target object in which the bonding target object and the functional sheet are positioned by causing a plurality of support pins provided in a pressurization mold penetrate the portion to be sealed of the bonding target object and the functional sheet or an outer portion of the portion to be sealed of the bonding target object and the functional sheet while performing the gas substitution step.

13. The sheet bonding method according to claim 12, wherein
the bonding target object is a package.

14. The sheet bonding method according to claim 12, wherein the area-enlarged portion is formed by forming a cutout portion in the bonding target object or the functional sheet.

15. The sheet bonding method according to claim 12, wherein the area-enlarged portion is formed by forming a through hole in the bonding target object.

16. The sheet bonding method according to claim 12, wherein, in the gas substitution step, gas is sprayed from the horizontal direction of the sealed space while spraying the gas to the area-enlarged portion.

17. The sheet bonding method according to claim 12, wherein through holes are formed in advance of the overlapping step at positions through which the support pins penetrate the bonding target object and the functional sheet.

18. The sheet bonding method according to claim 12, wherein when performing the sealing step, the plurality of support pins are put into the pressurization mold.

\* \* \* \* \*